Nov. 14, 1967  G. HEDÉN  3,352,422
APPARATUS FOR DIALYSIS, HEAT OR GAS EXCHANGE HAVING
PUMPING AND AGITATING MEANS
Filed Jan. 20, 1966  2 Sheets-Sheet 1
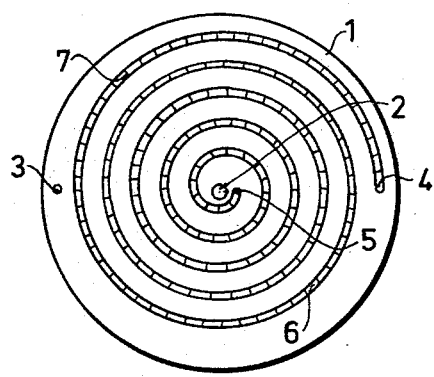
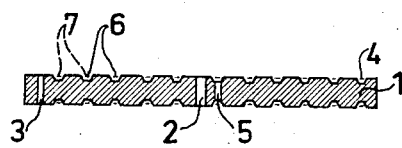
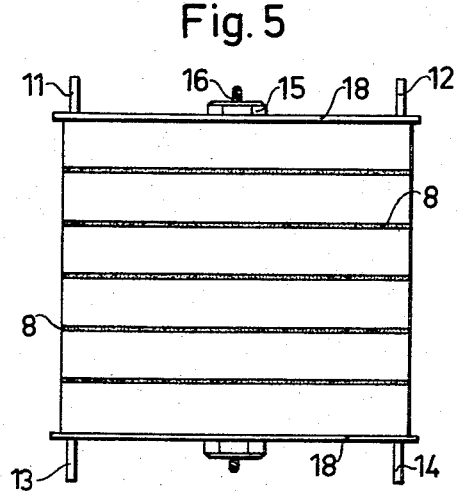
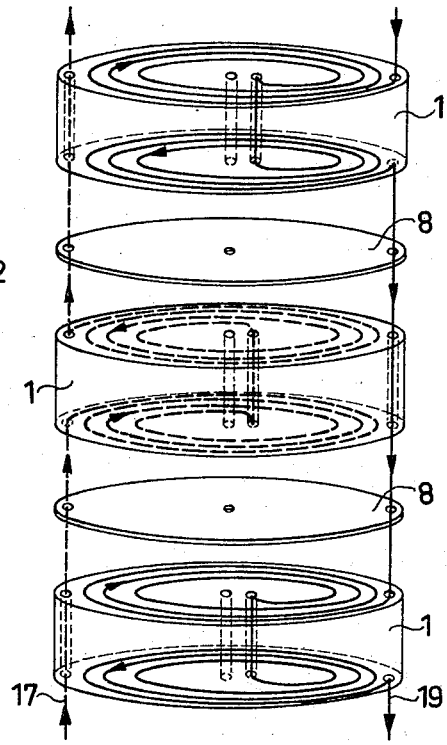
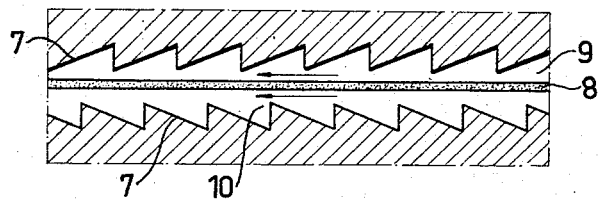
INVENTOR
Göran Hedén
BY Spencer & Kaye
ATTORNEYS

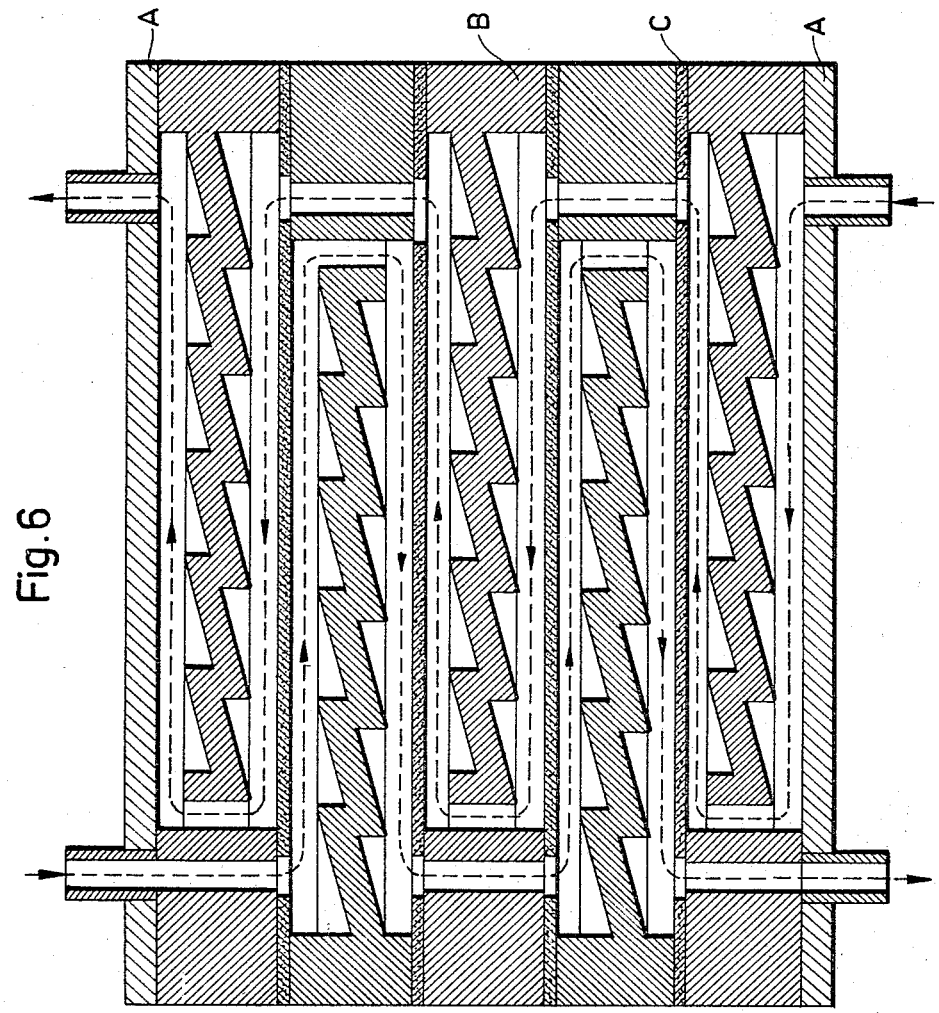

United States Patent Office 3,352,422
Patented Nov. 14, 1967

3,352,422
APPARATUS FOR DIALYSIS, HEAT OR GAS EXCHANGE HAVING PUMPING AND AGITATING MEANS
Göran Hedén, Karolinska Institutet, Solnavagen 1, Stockholm, Sweden
Filed Jan. 20, 1966, Ser. No. 521,902
Claims priority, application Great Britain, Jan. 20, 1965, 2,508/65
7 Claims. (Cl. 210—321)

ABSTRACT OF THE DISCLOSURE

In an apparatus for dialysis, heat exchange, or gas exchange including at least two plates separated by an exchange membrane, with means for receiving a fluid on both sides of the membrane, a groove is provided in each of the two plates on the surface facing the membrane, the groove being saw-tooth shaped in its longitudinal dimension, and one side of each tooth being sloped more steeply than the other side, so that a reciprocating motion in a generally parallel direction to the surface of the plates will tend to drive fluid along the paths defined by the grooves. In one embodiment of the invention, the grooves are spiral in shape, with an opening in the center of the plate adjacent to one end of the spiral and an opening near the edge of the plate adjacent to the other end of the spiral. A plurality of such plates and membranes are clamped together with the plates oriented so that fluid flows on the opposing sides of each membrane when the assembly is rocked or reciprocated.

The present invention concerns improvements in or relating to dialysis apparatus and more particularly to an improved apparatus for use in dialysis fermentor systems for cultivation of microorganisms or tissue cells, in the removal of low-molecular substances from sterile biological preparations or in medicine as a so-called artificial kidney, the same basic unit also being usable an an exchanger of heat between sterile liquids such as blood or saline, or for the addition or removal of gases in a liquid which is passed through one of the separate compartments of the apparatus.

Growth or fermentation of microbiological cultures for various purposes, e.g. the production of vaccines, enzymes and other valuable substances, has been known for a considerable number of years. In such work the use of dialysis membranes or interfaces has gained an increasing importance due to the several advantages obtained, for instance a concentration of the cell population during growth, extraordinary densities becoming obtainable. Furthermore, an increase of the total yield may occur and macromolecular products may accumulate, such as extracellular enzymes or toxins. Moreover, if the constituents of a complex nutrient medium are introduced on one side of the semipermeable membrane water or a simple solution may be used on the other side (the culture side). Thus, the fermentation medium can be simplified and clean cells or macromolecular products can be obtained for further treatment.

Dialysis as applied to fermentation may be described as providing a nutrient supply (including oxygen for aerobic organisms) by diffusion through a semipermeable membrane and simultaneously removing products formed through the semipermeable membrane separating the culture from the nutrient system. One advantage of such systems is that valuable microbiological products may be obtained on the "nutrient side" of the membrane and accordingly it is not required to free the desired substances from the microorganisms by centrifugation. The first step of purification is accordingly achieved already during the fermentation process.

There are, however, several problems connected with the use of semipermeable membranes for the two above-defined purposes. Dialysis apparatus hitherto used usually are of so-called "plate and frame" type or the filter-press type usually comprising a number of flat chambers for the dialysis, the semipermeable membrane being positioned between frames and gaskets as in a filterpress. Several types of such apparatus are described e.g. by Sidney B. Tuwiner, "Diffusion and Membrane Technology," ACS Monograph No. 156, Reinhold Publishing Corporation, New York, 1962. In order to avoid a laminar flow and to increase the contact with the semipermeable membrane devices for achieving turbulence in the two liquid systems are usually provided. Such members are usually designed as plate grids or spirals of stainless steel comprising surfaces for achieving the desired turbulence. It has, however, been shown that such devices do not give a completely satisfactory distribution of the liquid systems on the surfaces of the semipermeable membrane and moreover apparatus of the above-described previously known type are difficult to clean and to reassemble since they comprise a large number of parts which also increases the sterilizing difficulties. The circulation of the liquid systems is achieved by the aid of so-called sterile pumps which considerably increase the risk for deficient sterilization and contamination by foreign substances, etc.

The type of apparatus described above is also commonly adapted for use in medicine as a so-called "artificial kidney."

The present invention relates to an improved apparatus for use in dialysis of fermentor systems for concentrated culture of microorganisms and in medicine as an artificial kidney. Depending on the membrane material selected for separating its compartments it can also be made to function as a pure heat-exchanger or as a gas-exchanger device. In such applications, which include hypothermia and oxygenation in medical treatment, the simplicity and ease of sterilization become important features of the apparatus.

Thus, the present invention relates to an apparatus for dialysis, heat or gas exchange comprising two exchange compartments separated by a suitable membrane, the bottoms said compartments being provided with edges or ridges in a saw-tooth arrangement, the sides of which slope steeper in one direction than in the other, a desired pumping and mixing action being achieved on rocking the apparatus to and fro in a direction lengthwise to the compartments.

The following description refers to a preferred embodiment of the invention and it is to be understood that modifications of the apparatus described below may be made within the scope of the basic principle achieved according to the invention. Any such modifications are obvious to the expert.

The apparatus according to the preferred embodiment of the present invention consists of a number of suitably cylindrical discs, preferably made of a plastic, e.g. polytetrafluoroethylene (Teflon®) or similar material. The membranes, which may consist of semipermeable materials (for dialysis etc.) or of thin metal plates (for operation as a heat-exchanger), are located between said discs. Each individual cylindrical disc has on each circular end surface a cavity or groove in a spiral form beginning near the centre of the circular disc and continuing a suitable number of rounds (e.g. 2–20, preferably 4–10) and ending near the edge of said surface. The beginning of said spiral formed cavity near the centre on one end surface communicates with the beginning of the spiral formed cavity present on the opposite end surface of the same disc by a hole or boring through the disc. Each disc is also provided with a through hole or boring located diametrically opposite and at the same distance from the centre of the disc as the outer end points of the spiral formed cavities present on the two end surfaces of the cylindrical disc.

Each individual disc is provided with a boring, preferably located centrally, for passing through a threaded rod with a nut used for assembling and pressing together a desired number of the discs with interspacing membranes or metal plates to the formation of a unit, the discs being so arranged that the major part of one spiral groove coincides with that on the adjacent surface of the neighbouring disc to the formation of two exchange compartments separated by the membrane.

The bottom surfaces of the above-mentioned spiral grooves located on each end surface of the discs are provided with edges or ridges in a saw-tooth arrangement, the sides of which slope steeper in one direction than in the other for achieving a pumping action on rocking the assembly to and fro around the cylinder axis.

From the above general description of the apparatus according to the present invention it may be understood that the two compartments separated by membranes have the form of long and preferably narrow and shallow grooves. The dimensions of said grooves may be varied within wide limits. Thus, the breadth may be e.g. from about 5 mms. to about 50 mms. or more, the total depth of the groove may be e.g. from about 3 mms. to about 10 mms. or more, whereas the length of the compartments suitably is adapted according to the membrane area required in individual applications, such as 10–50 metres or more. The dimensions of the ridges or edges located on the bottom surface of the grooves may also be varied within wide limits according to the requirements for different purposes. However, in section the edges or ridges usually have the form of a saw-tooth as shown in the drawings, the longer one of the smaller sides stretching lengthwise along the groove. The space left between the membrane and the nearest point of the edges or ridges must be wide enough to permit flow of the liquids (or gas) but small enough so as to cause a sufficient turbulence therein. The said distance is usually about 10–30% of the total depth of the groove.

When assembling the apparatus for use a suitable number of the above-described discs, the membranes or metal plates being located between the discs, are positioned on each other as indicated above, suitable end plates comprising connection means for tubes being provided, to the formation of a unit which is pressed together by the threaded centre rod provided with a nut, the individual discs being so arranged in relation to each other that two compartments separated by the membranes or metal plates are formed, one of which is intended for circulation of the liquid from which a substance is to be separated by dialysis or to which gas is to be added or removed by diffusion or which is subjected to a temperature change, whereas the other compartment is intended for counter-current circulation of the liquid to which the substance in question is to be dialysed or to or from which heat is to be transported or for the circulation of the gas used for diffusion.

In the apparatus according to the preferred embodiment of the invention the circulation of the liquids is achieved by rocking the unit to and fro around the cylinder axis so as to cause the edges or ridges located in the spiral formed grooves exert a pumping action. This pumping action is due to the fact that the flow resistance in one direction is greater than the flow resistance in the opposite direction, depending on the difference in slope of the bottom surface parts of the grooves. The rocking of the unit causes flows, preferably counter-current to each other, in the two exchange compartments.

It is to be understood that the above-described edges or ridges on the bottom surface of the grooves have a double function, i.e. to achieve the pumping action and also to accomplish a turbulence in the liquids so as to bring about an improved contact with the semipermeable membrane or metal plate.

The magnitude of the pumping action of course depends on a number of factors, e.g. the viscosity and the density of the liquids, the dimensions of the grooves and their bottom surfaces, the number of rockings per time unit, the rocking angle etc. Practical tests have shown that pumping pressures about 2–5 cms. of water per disc are easily obtainable.

The semipermeable membrane used for dialysis in the apparatus according to the invention can be of any type commonly used for the purpose, such as membranes consisting of cellulose acetate, nitrate or acetate butyrate, polyvinyl chloride or acetate, unglazed porcelain etc. If special membrane filters are used macromolecules have a free passage whereas cells are retained, a fact which is of importance in tissue cell culture. It is to be understood that thin metal or glass sheets can be used when the unit is to be operated as a heat exchanger and that suitable diffusion membranes, such as silicone rubber or Teflon®, are used when one of the chambers is to be flushed with gas.

Due to the fact that the apparatus according to the present invention does not require internal pumping means and on account of its simplicity and the absence of gaskets etc. it is eminently suitable for use in work where cleanliness and facility of sterilization are of the greatest importance, e.g. in microbiological work and for use in medicine as indicated above.

The apparatus according to the invention has been described above with special reference to the use of cylindrical discs, in which the grooves are arranged in a spiral form. However, it is obvious that also other disc forms can be used within the basic principle of the invention, such as a rectangular form, in which case the rocking of the assembled unit in operation is made in a lengthwise direction, since with the use of e.g. rectangular discs the grooves comprising the above-mentioned edges or ridges are suitably arranged parallel preferably to the longer sides of the discs.

From the above description it is understood that for achieving the pumping action in the apparatus according to the invention so as to obtain preferably counter-current flows of liquids in the two separate compartments, it is required that the rocking movement to and fro of the assembled unit is made mainly in a direction lengthwise to the compartments.

The apparatus according to the preferred embodiment of the invention is described in detail in the accompanying drawings in which FIG. 1 shows a top view of one of the circular sides of one cylindrical disc, FIG. 2 is a side view of the same disc, FIG. 3 shows (in section) the saw-tooth formed edges or ridges in the spiral formed with the interspacing membrane, FIG. 4 is a diagram showing the counter-current flows of the two exchange systems in the apparatus, FIG. 5 shows an assembled unit comprising a number of discs, two end plates with connection means for tubes and the centre rod for pressing the assembly together, whereas FIG. 6 shows (in section) an apparatus according to the invention which consists of four rectangular discs B with interspacing membranes C and end plates A with connection means for tubes. The flow directions are indicated by arrows.

In FIG. 1 the circular side of the cylindrical disc is indicated by 1, whereas 2 indicates the centre hole for the assembling rod, 3 indicates the hole for passing through one of the flows of liquid (or gas), 4 indicates the outer end of the spiral formed groove 6 and 5 the inner end of the same with the through hole to the opposite end surface of the disc; 7 indicates one of the edges or ridges for achieving the pumping action and the turbulence upon rocking the assembled unit to and fro.

In FIG. 2 the figures have the same meaning as in FIG. 1.

FIG. 3 shows an arrangement of the saw-tooth formed edges or ridges 7 with the interspacing membrane 8, whereas 9 indicates one of the exchange compartments and 10 the other. The arrows indicate the directions of the flows. It has to be noted that when the flows on the two sides of the membrane between any two discs are concurrent, the total flows through the apparatus, which usually consists of about 10–50 discs, are counter-current.

FIG. 4 shows diagrammatically the arrangements of holes in the discs 1 and the interspacing membranes 8. One of the two counter-current flows is indicated by a straight line arrow 19, the other one by a dotted line arrow 17.

FIG. 5 shows an assembled unit comprising a number of discs 1, the central assembling threaded rod 16 with nut 15, whereas 18 indicates the end plates with means 11–14 for attaching tubes for inlet and outlet of the two exchange systems.

What I claim is:

1. Apparatus for dialysis, heat exchange or gas exchange, comprising, in combination: at least two plates separated by an exchange membrane; there being a groove in each opposite surface of said plates; a passage leading to one end of each groove for introducing fluid to the groove and a passage leading from the other end of each groove for withdrawing fluid from the groove; and the cross-sectional area of each groove transverse to the flow path alternately gradually increasing and steeply decreasing along substantially the entire length of said groove in a direction opposite to the direction of flow, such cross-sectional area profile constructed to cause a pumping action upon the rocking of said apparatus.

2. Apparatus according to claim 1 comprising more than two of the plates clamped together, there being a respective membrane between each pair of opposing surfaces.

3. Apparatus according to claim 2 in which said passages are arranged for counterdirectional flow of liquid through adjacent grooves on either side of each membrane.

4. Apparatus according to claim 2 in which said plates are cylindrical and the grooves in each follow a spiral on the flat surfaces of said cylinder.

5. Apparatus according to claim 4 in which there is a passage from the center of the spiral groove on each surface of each disc leading through such disc to the center of the spiral groove on the other surface of that disc, there also being a passage leading from the end of the spiral groove on one surface of each disc through the membrane adjacent to such surface and through the next disc and through the next membrane to the end of the spiral groove adjacent to such next membrane on the next further disc.

6. Apparatus according to claim 1 in which one wall of each groove has a saw-tooth profile made up of a series of pairs of planar faces, one face of each pair being at right angles to the line of the groove and the other face being at an acute angle to the line of the groove.

7. Apparatus as defined in claim 1 wherein the grooves on either side of the membrane coincide over at least a substantial part of their paths.

References Cited

UNITED STATES PATENTS

| | | | |
|---|---|---|---|
| 2,457,018 | 12/1948 | Wantling | 210—241 |
| 3,065,148 | 11/1962 | Ferrari | 195—103.5 |
| 3,074,559 | 1/1963 | Savino | 210—321 |
| 3,212,499 | 11/1965 | Koreski | 210—321 X |

REUBEN FRIEDMAN, *Primary Examiner.*

F. SPEAR, *Assistant Examiner.*